United States Patent [19]
Brazas, Jr. et al.

[11] Patent Number: 4,948,216

[45] Date of Patent: Aug. 14, 1990

[54] OPTICAL DEVICES HAVING LAYERS OF LOW MOLECULAR WEIGHT ORGANIC MATERIALS AND METHODS FOR MAKING

[75] Inventors: John C. Brazas, Jr.; Delwyn E. Machiele, both of Rochester, N.Y.

[73] Assignee: Eastman Kodak Company, Rochester, N.Y.

[21] Appl. No.: 273,785

[22] Filed: Nov. 21, 1988

[51] Int. Cl.$^5$ .................... G02B 6/12; C07D 209/48; B05D 3/00; C03G 15/04

[52] U.S. Cl. ........................ 350/96.11; 350/96.34; 350/96.12; 350/320; 548/476; 427/164; 427/296; 430/66; 430/69; 430/128; 430/133

[58] Field of Search ................ 430/945, 495, 321, 66, 430/62, 96, 69, 128, 132, 133; 350/96.10, 96.11, 96.12, 96.34, 320; 548/476; 427/164, 296

[56] References Cited

U.S. PATENT DOCUMENTS

| | | | |
|---|---|---|---|
| 3,953,620 | 4/1976 | Chandross et al. | 427/53 |
| 3,993,485 | 11/1976 | Chandross et al. | 96/27 H |
| 4,237,194 | 12/1980 | Upson et al. | 430/69 X |
| 4,308,332 | 12/1981 | Upson et al. | 430/62 |
| 4,407,921 | 10/1983 | Bennett et al. | 430/96 |
| 4,499,165 | 2/1985 | Molaire | 430/495 X |
| 4,526,706 | 7/1985 | Upson et al. | 430/62 X |
| 4,792,208 | 12/1988 | Ulman et al. | 350/96.34 |

*Primary Examiner*—Brian Healy
*Attorney, Agent, or Firm*—J. Jeffrey Hawley

[57] ABSTRACT

There is disclosed an optical device comprising a support having thereon a transparent amorphous layer of a low molecular weight organic compound, said layer having a glass transition temperature above about 50° C. Also disclosed is a method for making the device including the step of vacuum depositing the organic compound on the support. Particularly preferred devices are integrated optical devices which include a pattern of a second index of refraction or effective index of refraction in the layer, which pattern can define an optical element.

8 Claims, No Drawings

OPTICAL DEVICES HAVING LAYERS OF LOW MOLECULAR WEIGHT ORGANIC MATERIALS AND METHODS FOR MAKING

FIELD OF THE INVENTION

The present invention relates to optical devices of the type which comprise a support having thereon a layer of transparent material which provides an optic function. The invention thus relates to devices such as lenses having antireflection coatings and integrated optic devices having layers for the propagation of light, which layers include optical elements.

DESCRIPTION RELATIVE TO THE PRIOR ART

Transparent layers for optical devices can serve a variety of optical functions. For example, the optical performance of a lens can be improved by providing an antireflecting coating. Such a coating, for example, can improve the contrast of the lens in a variety of conditions. Such antireflecting coatings are made by depositing a layer or layers of material having predetermined indices of refraction in predetermined thicknesses to achieve the desired antireflective condition.

Other optical devices use transparent layers for other functions. For example, integrated optical devices typically comprise a layer of transparent material on a support. Since the layer has a different index of refraction from the support on one side of the layer and air or lower index of refraction material on the other side of the layer, light coupled into the layer will be propagated through the layer and emerge on the other side. The layer contains patterns of material having an index of refraction or effective index of refraction that is different from the remainder of the layer. These patterns can represent optical elements such as lenses, e.g. a mode index lens or a Luneberg lens; channel waveguides; optical buffer layers; or beam splitters, to mention but a few useful elements.

The present invention relates to the materials that are used for the transparent layers of the mentioned optical devices. One type of material that has been suggested is organic polymers. These polymers can be coated, for example by spin coating, to provide useful devices such as integrated optic circuits. In U.S. Pat. No. 3,953,620 for example, there is disclosed a process whereby an integrated optic circuit is prepared by coating a polymer containing a light sensitive dopant. Imagewise exposure of the layer leads to imagewise reduction in the volatility of the dopant. After removal of the unexposed dopant, the portions of the layer still containing the dopant have a different index of refraction from the remainder of the layer.

Light sensitive monomers can also be coated from solution and polymerized in situ in the desired pattern. Reference is made to U.S. Pat. No. 3,993,485.

Some optical devices use layers which are not transparent. For example, in U.S. Pat. No. 4,499,165, there is disclosed a useful composition for the optical recording layer in an optical recording element. In this element, there is provided a binder mixture of organic compounds that in turn is mixed with large amounts of dye to form a layer that absorbs laser radiation. This composition is not transparent as are the layers in the devices of the invention and the layers in '165 are again solvent coated. Reference is made to col 36 lines 25 to 35 of that patent.

These processes wherein polymers or monomers are solvent coated on the support, suffer from many disadvantages. First, solution coating, whether it be of the polymer or the monomers, produces layers which are of less than desired uniformity for optical applications. Further, these processes inevitably leave residual solvent in the layer which is disadvantageous for long term storage or subsequent process steps. In addition, multiple layers are difficult if not impossible since the solvent used to coat the second layer often attacks the first layer or will not wet the surface of the first layer.

It is common to coat inorganic materials using vacuum coating techniques. This type of coating is capable of producing uniform coatings without solvents. Multiple layers are more easily achieved than with solvent coating. However, vacuum coating is not possible with the organic polymeric materials of the above mentioned references. The organic polymers do not have sufficient vapor pressure to evaporate even under high vacuum conditions. If the temperature of the polymer is raised to increase the vapor pressure, the polymer decomposes.

The present inventors have attempted to vacuum evaporate very low molecular weight polymers. While some success has been achieved in depositing these polymers, the resulting layers were so soft as to be not practical.

Thus, the problem to be solved by the present invention is to provide materials and methods which overcome these drawbacks of the prior art.

SUMMARY OF THE INVENTION

In accordance with the present invention, there is provided, in one aspect, an optical device comprising a support having thereon a transparent amorphous layer of a low molecular weight organic compound, said layer having a glass transition temperature above about 50° C.

In another aspect, there is provided a method of making the described device, said method comprising the step of vacuum depositing said organic compound onto said support.

In a preferred embodiment of the invention, the device is an integrated optic device. Thus, there is provided an integrated optic device comprising a support having thereon a transparent amorphous layer for light propagation having a first refractive index, said layer comprising a low molecular weight organic compound having a glass transition temperature above about 50° C., said layer further comprising a pattern having a second refractive index or effective index of refraction, said pattern defining an optical element.

DETAILED DESCRIPTION OF THE INVENTION

In the present specification and claims, the following meanings are to be understood:

By "amorphous" it is meant that there is substantially no crystallinity in the layer or microstructure attributed to the coating process. This can be determined by visual inspection under a microscope; by Raman spectroscopic techniques; or by the observation of scattered light from the waveguide or device.

The term "low molecular weight organic compound" is intended to exclude film forming organic polymers which typically have a molecular weight of above about 5000. The compounds useful herein will usually have a molecular weight of below about 1000.

Compounds whose vapor pressure is sufficiently high so that the compound can be vacuum deposited are preferred.

The "effective index of refraction" of a layer is determined by the three dimensional refractive index of the material that makes up the layer and the thickness of the layer. Thus, optical elements can be formed in the layer by either forming a pattern in the layer of a material that has a different index of refraction or by altering the thickness of the layer to form variation in the effective refractive index in the desired pattern. Reference is made to P. K. Tien, Appl. Opt., 10 2395 (1971) and R. Ulrich, R. J. Martin, Appl. Opt., 10, 2077 (1971) for a more complete theoretical discussion of effective index of refraction.

Compounds that are useful in the present invention have a glass transition temperature of greater than about 50° C. The glass transition temperature is measured using conventional techniques. For example differential scanning calorimetry. The measurement should be taken from amorphous bulk material that is substantially free from residual solvents and decomposition products since that is the condition of the materials when they are vacuum coated according to the process aspects of the invention.

The low molecular weight organic compounds that form the transparent layers described herein can be the "multicyclic aromatic nucleus" compounds described in U.S. Pat. No. 4,499,165 or derivatives thereof.

A "multicyclic aromatic nucleus" is a nucleus comprising at least two cyclic groups one of which is aromatic, including aromatic heterocyclic ring groups. The cyclic group may be substituted with substituents such as aliphatic hydrocarbons, including cycloaliphatic hydrocarbons, other aromatic ring groups such as aryl, and heterocyclic ring groups such as substituted or fused thiazole oxazole, imide, pyrazole, triazole, oxadiazole, pyridine, pyrimidine, pyrazine, triazine, tetrazine and quinoline groups. The substituents are fused or non-fused and mono or polycyclic. Examples of multicyclic aromatic nuclei include 9,9-bis(4-hydroxy-3,5-dichlorophenyl)fluorene, 4,4'-hexahydro-4,7-methanoindan-5-ylidenebis(2,6-dichlorophenol); 9,9-bis(4-hydroxy-3,5-dibromophenyl)fluorene, 4,4'-hexahydro-4,7-methanoindan-5-ylidenebis(2,6-dibromophenol); 3',3'',5',5''-tetrabromophenolphthalein, 9,9-bis(4-aminophenyl)fluorene, phenylindandiols; 1,1'-spirobiindandiols, 1,1'-spirobiindandiamines, 2,2'-spirobichromans; 7,7-dimethyl-7H-dibenzo[c,h]xanthenediol; 9,9-dimethylxanthene-3,6-bis(oxyacetic acids); 4,4'-(3-phenyl-1-indanylidene)-diphenol and other bisphenols; 9-phenyl-3-oxo-2,6,7-trihydroxyxanthene; and the like.

Useful multicyclic aromatic nuclei compounds are:

A. The phenylindan diols disclosed in *Research Disclosure*, Item No. 11833, Feb. 1974, and U.S. Pat. Nos. 3,803,096, 3,859,364 and 3,886,124 and the phenylindan diamines of U.S. Pat. Nos. 3,897,253 and 3,915,939, B. The 1,1'-spirobiindan diols and diamines disclosed in U.S. Pat. No. 3,725,070; and the 1,1'-spirobiindan (dicarboxylic acids) of *Research Disclosure*, Item No. 9830, Jun. 1972 (anonymous), C. The 1,1'-spirobiindan-5,5'-diamines disclosed in *Research Disclosure*, Item No. 13117, Mar. 1975, D. The 2,2'-spirobichromans disclosed in U.S. Pat. No. 3,859,097, E. The 7,7-dimethyl-7H-dibenzoic[c,h]xanthene diols disclosed in U.S. Pat. Nos. 3,859,254 and 3,902,904, F. The 9,9-dimethylxanthene-3,6-bis(oxyacetic acids) disclosed in *Research Disclosure*, Item No. 9830, Jun. 1972 (anonymous), G. The 4,4'-(3-phenyl-1-indanylidene)diphenols disclosed in *Research Disclosure*, Item No. 13101, Mar. 1975, H. The 4,4'-(hexahydro-4,7-methanoindan-5-ylidene)diphenols disclosed in *Research Disclosure*, Item No. 13568, Jul. 1975, I. The bisphenols disclosed in *Research Disclosure*, Item No. 13569, Jul. 1975, J. The sulfonyldibenzoic acids disclosed in *Research Disclosure*, Item No. 14016, Dec. 1975, K. The polycyclic norbornanes of *Research Disclosure*, Item No. 9207, Dec. 1971, and L. The 1,2,3,4-tetrahydronaphthalenes disclosed in *Research Disclosure*, Item No. 13570, Jul. 1975.

In some instances, the multicyclic aromatic nucleus compound itself will not have the desired glass transition temperature. In that case, derivatives of these compounds are useful. The compounds described above are bifunctional and can therefore be reacted with reactive compounds to form side chains on the nucleus. Preferred side chain groups are aliphatic groups and aromatic groups which can include substituents such as halogen, cyano or alkoxy; and hetero atom containing groups. These groups are described more completely below in relation to preferred compounds. Preferred compounds are substituted phenylindan compounds and phthalimide compounds described below.

The phenylindan compounds have the structure:

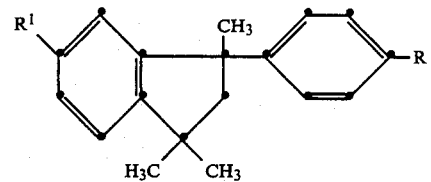

wherein R and $R^1$ are independently selected from the group consisting of nitro, amino, carboxyl, foramido groups, carbamoyl groups and heterocyclic groups derived from amino or carboxyl groups.

Useful foramido and carbamoyl groups are represented by the formulae —NHCOR$^2$ and —CONR$^2$R$^3$ respectively, wherein R$^2$ and R$^3$ are independently selected from the group consisting of unsubstituted and substituted aliphatic, aromatic and heterocyclic groups such that the molecular weight of the compound is less than about 1000.

Useful aliphatic groups include alkenes such as ethyl, propyl and nonyl; branched aliphatic groups such as 2,2-dimethyl propyl; cycloaliphatic such as cyclohexyl; substituted aliphatic such as aliphatic substituted with halogen, alkoxy, cyano and aromatic groups such as perfluoropropyl, 2-methoxyethyl and phenyl methyl; and unsaturated aliphatic groups such as 2-propenyl and 1-cyclohexenyl.

Useful aromatic groups include phenyl and naphthyl and substituted aromatic such as aromatic substituted with halogen, alkyl, cyano, alkoxy and hydroxy such as 4-methoxy phenyl and 3,4-dichloro phenyl.

Useful heterocyclic groups include pyridyl, furanyl, thiophenyl, quinolyl and piperidyl; and substituted heterocyclic such as heterocyclic substituted with alkyl, halogen and alkoxy such as 5-butylpyridyl.

Heterocyclic groups derived from amino or carboxyl groups are those groups that can be formed by reacting the amino or carboxyl group with another reagent to form the heterocycle. Useful groups therefore include the following, which can be substituted, for example, with aliphatic groups; halogen; alkoxy and nitro:

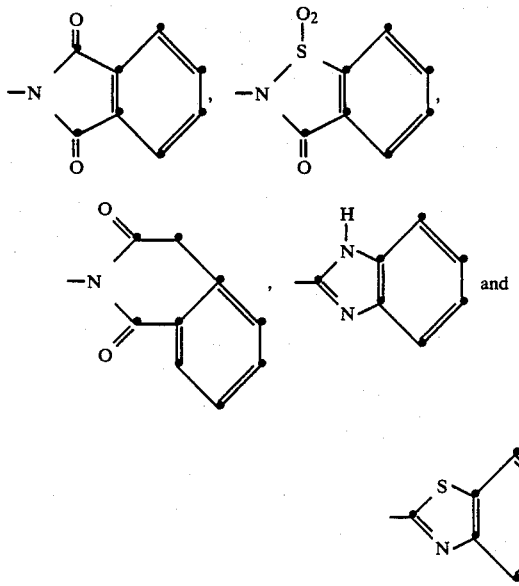

The foramido compounds are made from the starting diamine phenylindan by reaction with the acid chloride corresponding to the desired R group. The acid chloride is made from the corresponding acid by reaction with thionyl chloride. The reaction can take place in a suitable solvent such as a combination of triethylamine in dichloromethane.

The similar carbamoyl compounds are made in a similar manner starting from the phenylindandicarboxylic acid, converting it to the corresponding acid chloride and reacting the acid chloride with the desired amine.

Where R and $R^1$ are different, mixtures of the side chain precursors are used and the compound isolated by liquid chromotography. In preferred embodiments, there is no need to resolve the mixture as it is useful directly.

The preferred phthalimide compounds are also the subject of copending commonly assigned U.S. Ser. No. 273,550, pending, filed on even date herewith and entitled PHTHALIMIDE COMPOUNDS FOR FORMING AMORPHOUS LAYERS BY VACUUM DEPOSITION.

The phthalimide compounds have the structure:

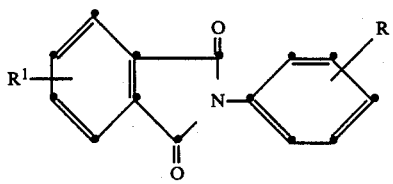

wherein R and $R^1$ are as defined above.

The symmetrically substituted compounds, that is $R = R^1$, are made starting with nitro phthalic anhydride. This is reacted with a nitroaniline to give a dinitro-N-phenyl-phthalimide. This in turn is reduced to the corresponding diamino compound which is then reacted with the oxychloride of the desired side chain.

The similar unsymmetrical compounds are made by reacting the appropriately substituted aniline with the proper nitro-phthalic anhydride followed by reduction to the corresponding amine. The amine is then reacted with the desired acid chloride.

One of the advantages of the described materials is that the index of refraction can be changed by changing the side chain. In addition, with the vacuum coating technique, the compounds can be easily mixed. Thus, the index of refraction of the layer can be carefully selected for the particular application. Still further, by providing two or more sources of different compounds in the vacuum chamber, a top-to-bottom gradient of index of refraction can be provided in the layer by varying the proportions of the compounds that are evaporated during the deposition of the layer. These properties are either difficult or impossible to provide with other methods using organic materials.

The difference in index of refraction or effective index of refraction can also be used to produce desired optical elements in the layer. In one method, one compound is evaporated through a mask to produce one pattern on the substrate. Another compound having a different index of refraction is then evaporated through a complimentary pattern. The result is a layer including the desired optical element.

Another method for including the desired pattern in the layer is to first coat a uniform layer of one compound. A pattern of either the same or a different compound is then coated on the surface of the layer. As a result of the increased thickness in those areas of the layer containing the pattern, those areas will have a different effective index of refraction.

The thickness of the layer, the number of layers, the selected indices of refraction etc. are determined by the intended use. With the materials described herein, accurate and continuous selection of the index of refraction over the range of 1.475 to 1.725 is possible. Further, the layers have long term stability and good mechanical durability.

The vacuum coating technique results in several additional advantages. The layers that are formed exhibit very low birefringence and light attenuation. Precise and repeatable control of film thickness is possible. Multiple layers or stacks of layers of different index of refraction can be easily prepared.

The vacuum apparatus that is used to carry out the method of the invention is conventional. A typical vacuum coating apparatus will include a vacuum chamber which is connected to a mechanical vacuum pump which typically provides a pressure as low as about $10^{-3}$ mm Hg. In addition, a diffusion pump is provided to reduce the vacuum further, typically down to about $10^{-6}$ mm Hg. Inside the chamber, there is provided an evaporation source for the material. The container is typically covered, the cover having an opening to direct the flow of material. The substrate to be coated is usually above the container. The uniformity of the coating can be improved by increasing the distance between container and the support.

The support onto which the organic compound is coated is not critical. The choice of support will be determined by the use of the device. The support can be, for example, glass in the case of a lens; silicon or quartz in the case of integrated optical devices. Other inorganic layers can be provided either between the organic compound layer and the support or over the organic compound layer.

The following examples are presented for a further understanding of the invention.

In the examples below, the glass transition temperature is reported. The glass transition temperature was determined using a DuPont differential scanning calorimeter (DSC). Ten grams of sample was placed in an aluminum DSC pan and placed in the DSC cell. The cell was purged with dry nitrogen at a flow rate of 30 cc/minute. The cell was then heated from 0° C. to 300° C. at a heating rate of 10° C. per minute. The sample was then quenched to 0° C. and reheated as before. The glass transition temperature was determined from the second heating.

EXAMPLES 1–28:

A series of compounds were vacuum deposited on quartz supports in a vacuum coating apparatus. The pertinent conditions for the deposition were: chamber pressure less than $1 \times 10^{-6}$ mm Hg; substrate temperature was room temperature or about 22° C.; deposition rate of between 0.4 to 1.0 nm/sec; substrate height was 65 cm. The thicknesses of the films were between 0.10 μm and 1.0 μm.

The geometric thickness and the refractive index was determined by ellipsometry and waveguide analysis. This is described in detail in Rabolt et al, IBM J. Res. Develop., Vol 26 no. 2 pg 209, 1982.

Table I lists the results for the phenyl indan series:

TABLE I

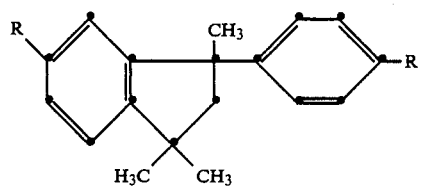

| Example | R | Refractive Index | Tg °C. |
|---|---|---|---|
| 1 | —CONH₂ | 1.613 | 110 |
| 2 | —NHCO—C₆H₄—OCH₃ | 1.630 | 114 |
| 3 | —NHCO—C₆H₄—Cl | 1.629 | 118 |
| 4 | —NHCO—C₆H₄—Br | 1.647 | 134 |
| 5 | —NHCO—C₆H₄—CN | 1.677 | 138 |
| 6 | —NHCO—C₆H₅ | 1.634 | 114 |
| 7 | —NHCO—C₆H₃Cl₂ | 1.649 | 127 |
| 8 | —NHCO—C₆F₅ | 1.548 | 123 |
| 9 | —NHCO—(naphthyl) | 1.656 | 133 |
| 10 | —CONH—C₆H₄—Br | 1.659 | 136 |
| 11 | —NHCO—C₆H₅ | 1.569 | 150 |
| 12 | —NHCOCH₂C(CH₃)₃ | 1.537 | 112 |
| 13 | —NHCOCH₂CH₂CH₃ | 1.572 | 78 |
| 14 | —NHCOCF₂CF₂CF₃ | 1.472 | 60 |
| 15 | —CON—(C₆H₅)₂ | 1.548 | 99 |
| 16 | —CONHC(CH₃)(CH₂CH₃)H | 1.545 | 86 |
| 17 | —N(phthalimido-methyl) | 1.660 | 128 |

TABLE I-continued
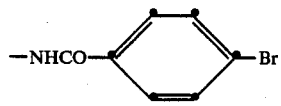
| Example | R | Refractive Index | Tg °C. |
|---|---|---|---|
| 18 | Mixture of —NHCO—⟨Ph⟩—Br | 1.654 | 121 |
| | —NHCO—⟨naphthyl⟩, and | | |
| | —NHCO—⟨Ph⟩—OCH₃ | | |
Table II lists the results for other compounds:
TABLE II
| Examples | Structure | R | Refractive Index |
|---|---|---|---|
| 19–21 | RHN—⟨Ph⟩—(fluorene)—⟨Ph⟩—NHR | —COCH₂C(CH₃)₃ | 1.599 |
| | | —H | 1.701 |
| | | —CO—⟨Ph⟩—Br | 1.708 |
| 22–23 | RO—⟨Ph(Br)₂⟩—(fluorene)—⟨Ph(Br)₂⟩—OR | —COCH₂C(CH₃)₃ | 1.572 |
| | | —OH | 1.659 |
| 24–25 | RO—⟨Ph⟩—(dimethylindane)—⟨Ph⟩—OR | —COCH₂C(CH₃)₃ | 1.514 |
| | | —H | 1.575 |
| | | —CO—⟨Ph⟩—Br | 1.610 |
| 26–28 | | | |

TABLE II-continued

| Examples | | R | Refractive Index |
|---|---|---|---|
| | RNH structure with NHR (phthalimide-type) | —COCH₂C(CH₃)₃ | 1.578 |
| | | —H | 1.755 |
| | | —CO—C₆H₄—Br | 1.731 |

EXAMPLE 29

Example 1 was repeated except that the vacuum chamber contained two sources of compound. In one source was compound 3 of Table I and in the other source was compound 12 of Table I. By varying the rate at which each compound was evaporated, different mole fractions of the two compounds were deposited. The data is in Table III below.

TABLE III

| Mole Fraction Compound 3 | Refractive Index |
|---|---|
| 0 | 1.538 |
| .21 | 1.562 |
| .50 | 1.585 |
| .77 | 1.615 |
| 1.00 | 1.628 |

EXAMPLE 30

This is an example of an optical waveguide having incorporated therein a mode-index lens. The layer comprising the waveguide was first vacuum deposited and then, the lens was deposited by vacuum deposition through an appropriately shaped mask. Thus, the lens was formed by increasing the thickness of the layer in selected areas, thereby changing the effective index of refraction in those areas.

The waveguide and overlay mode-index lens were coated during the same deposition cycle and consisted of the same material. That material was the mixture that is described in relation to Example 18 above. Coating was made onto a quartz substrate having an index of refraction of 1.457.

The waveguide was a uniform film coated to a thickness of 0.183 μm and had an effective index of refraction of 1.484. The additional material was then deposited through a lens shaped mask onto the waveguide. During the deposition of the additional material, the lens mask was moved. As a result, the additional material had leading and trailing tapered regions. The thickness in the center of the lens was 0.732 μm thicker than the rest of the waveguide and had an effective index of refraction of 1.634.

The mask position was selected digitally by a microcomputer controlling a translating stage. The translating stage had an incremental step resolution of 3.39 μm and a total range of 25 cm. The input to the microcomputer for positioning as the coating proceeded was a piezoelectric film thickness monitor. During the deposition of the additional material for the lens, the mask was translated linearly with a target thickness taper of 0.913 nm thickness/μm of movement.

After formation of the lens in the waveguide, two collimated beams of light were coupled into the waveguide. A photodiode was mounted with micropositioning along the optical axis and perpendicular to the optical axis. The photodiode was used to detect the intersection of the beams. The focal length of the lens was determined by this method to be 13.9 mm which was within 6% of the designed focal length.

The invention has been described in detail with particular reference to preferred embodiments thereof, but it will be understood that variations and modifications can be effected within the spirit and scope of the invention.

What is claimed is:

1. An optical device comprising a support having thereon a transparent amorphous layer of a low molecular weight organic compound, said layer having a glass transition temperature above about 50° C.

2. An optical device according to claim 1, wherein said glass transition temperature is above about 100° C.

3. An optical device according to claim 1, wherein said layer comprises a mixture of said low molecular weight organic compounds.

4. An optical device according to claim 1, wherein said low molecular weight organic compound is a phenylindan compound of the structure:

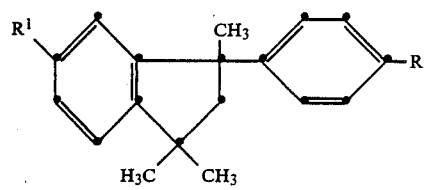

wherein R and $R^1$ are independently selected from the group consisting of nitro, amino, carboxyl, foramido groups, carbamoyl groups and heterocyclic groups derived from amino or carboxyl groups.

5. An optical device according to claim 1, wherein said low molecular weight organic compound is a phthalimide compound of the structure:

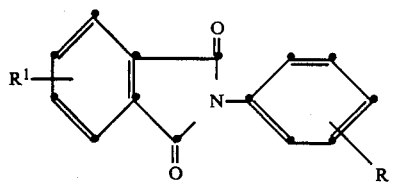

wherein R and $R^1$ are independently selected from the group consisting of nitro, amino, carboxyl, foramido groups, carbamoyl groups and heterocyclic groups derived from amino or carboxyl groups.

6. A method of making an optical device comprising a support having thereon a transparent amorphous layer of a low molecular weight organic compound, said layer having a glass transition temperature above about 50° C., said method comprising the step of vacuum depositing said organic compound onto said support.

7. An integrated optic device comprising a support having thereon a transparent amorphous layer for light propagation having a first refractive index, said layer comprising a low molecular weight organic compound having a glass transition temperature above about 50° C., said layer further comprising a pattern having a second refractive index said pattern defining an optical element.

8. An integrated optic device according to claim 7, wherein said pattern having a second refractive index is formed by an increased thickness in said layer corresponding to said pattern.

* * * * *